(12) United States Patent
Assaf (10) Patent No.: US 6,728,830 B1
(45) Date of Patent: Apr. 27, 2004

(54) METHOD AND APPARATUS FOR MODIFYING THE RESERVE AREA OF A DISK DRIVE

(75) Inventor: Mahmoud Assaf, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 597 days.

(21) Appl. No.: 09/648,838

(22) Filed: Aug. 25, 2000

(51) Int. Cl.[7] ............................................. G06F 12/14
(52) U.S. Cl. ........................ 711/112; 711/152; 711/163; 711/173; 713/100
(58) Field of Search ................................ 711/112, 152, 711/163, 173; 713/100

(56) References Cited

U.S. PATENT DOCUMENTS

| | | |
|---|---|---|
| 5,027,396 A | 6/1991 | Platteter et al. ............ 713/185 |
| 5,375,243 A | 12/1994 | Parzych et al. ............ 713/202 |
| 5,966,732 A * | 10/1999 | Assaf ........................ 711/170 |

* cited by examiner

Primary Examiner—Donald Sparks
Assistant Examiner—Bao Q Truong
(74) Attorney, Agent, or Firm—Scott Charles Richardson; Walter J. Malinowski; Suiter - West (57) ABSTRACT

The present invention is directed to a method for allocating resources in a disk drive having a user accessible area, a reserve area, and a boundary between the user accessible area and the reserve area. A capacity of the disk drive accessible to the user is read, the boundary between the user accessible area and the reserve area so as to increase the reserve area, and information is inputted to the increased reserve area.

100 Claims, 5 Drawing Sheets

| COMMAND BLOCK OUTPUT REGISTERS | 7 | 6 | 5 | 4 | 3 | 2 | 1 | 0 |
|---|---|---|---|---|---|---|---|---|
| REGISTER | | | | | | | | |
| DATA | – | – | – | – | – | – | – | – |
| FEATURE | – | – | – | – | – | – | – | – |
| SECTOR COUNT | – | – | – | – | – | – | – | – |
| SECTOR NUMBER | – | – | – | – | – | – | – | – |
| CYLINDER LOW | – | – | – | – | – | – | – | – |
| CYLINDER HIGH | – | – | – | – | – | – | – | – |
| DEVICE/HEAD | – | – | – | 1 | L | 1 | D | – |
| COMMAND | 1 | 1 | 1 | 1 | 0 | 0 | 0 | 0 |

FIG. 4

| COMMAND BLOCK INPUT REGISTERS | 7 | 6 | 5 | 4 | 3 | 2 | 1 | 0 |
|---|---|---|---|---|---|---|---|---|
| REGISTER | | | | | | | | |
| DATA | – | – | – | – | – | – | – | – |
| ERROR | – | – | – | – | – | – | – | – |
| SECTOR COUNT | V | V | V | V | V | V | V | V |
| SECTOR NUMBER | V | V | V | V | V | V | V | V |
| CYLINDER LOW | V | V | V | V | V | V | V | V |
| CYLINDER HIGH | V | V | V | V | V | V | V | V |
| DEVICE/HEAD | – | – | – | – | H | H | H | H |
| STATUS | | | | | | | | |

FIG. 5

| ERROR REGISTER | 7 | 6 | 5 | 4 | 3 | 2 | 1 | 0 |
|---|---|---|---|---|---|---|---|---|
| | BBK | UNC | 0 | IDN | 0 | ABT | TON | AMN |
| | 0 | 0 | 0 | 0 | 0 | V | 0 | 0 |

FIG. 6

| STATUS REGISTER | 7 | 6 | 5 | 4 | 3 | 2 | 1 | 0 |
|---|---|---|---|---|---|---|---|---|
| | BSY | RDY | DWF | DSC | DRQ | COR | IDX | ERR |
| | 0 | V | 0 | – | – | 0 | – | V |

FIG. 7

| COMMAND BLOCK OUTPUT REGISTERS | | | | | | | | |
|---|---|---|---|---|---|---|---|---|
| REGISTER | 7 | 6 | 5 | 4 | 3 | 2 | 1 | 0 |
| DATA | - | - | - | - | - | - | - | - |
| FEATURE | - | - | - | - | - | - | - | B |
| SECTOR COUNT | - | - | V | V | V | V | V | V |
| SECTOR NUMBER | V | V | V | V | V | V | V | V |
| CYLINDER LOW | V | V | V | V | V | V | V | V |
| CYLINDER HIGH | V | V | V | V | V | V | V | V |
| DEVICE/HEAD | 1 | L | 1 | D | V | V | V | V |
| COMMAND | 1 | 1 | 1 | 1 | 0 | 0 | 0 | 1 |

FIG. 8

| COMMAND BLOCK INPUT REGISTERS | | | | | | | | |
|---|---|---|---|---|---|---|---|---|
| REGISTER | 7 | 6 | 5 | 4 | 3 | 2 | 1 | 0 |
| DATA | - | - | - | - | - | - | - | - |
| ERROR | - | - | - | - | - | - | - | - |
| SECTOR COUNT | - | - | - | - | - | - | - | - |
| SECTOR NUMBER | V | V | V | V | V | V | V | V |
| CYLINDER LOW | V | V | V | V | V | V | V | V |
| CYLINDER HIGH | V | V | V | V | V | V | V | V |
| DEVICE/HEAD | - | - | - | - | H | H | H | H |
| STATUS | - | - | - | - | - | - | - | - |

FIG. 9

| ERROR REGISTER | | | | | | | | |
|---|---|---|---|---|---|---|---|---|
| 7 | 6 | 5 | 4 | 3 | 2 | 1 | 0 |
| BBK | UNC | 0 | IDN | 0 | ABT | TON | AMN |
| 0 | 0 | 0 | 0 | 0 | V | 0 | 0 |

FIG. 10

| STATUS REGISTER | | | | | | | | |
|---|---|---|---|---|---|---|---|---|
| 7 | 6 | 5 | 4 | 3 | 2 | 1 | 0 |
| BSY | RDY | DWF | DSC | DRQ | COR | IDX | ERR |
| 0 | V | 0 | - | - | 0 | - | V |

METHOD AND APPARATUS FOR MODIFYING THE RESERVE AREA OF A DISK DRIVE

The present invention relates to storage devices. More specifically, the present invention relates to a method and apparatus for modifying the reserve area of a disk drive. U.S. Pat. No. 5,966,732, issued on Oct. 12, 1999 is herein incorporated by reference in its entirety.

FIELD OF THE INVENTION

BACKGROUND OF THE INVENTION

A standard disk drive typically includes space for storing data available to the user and a fixed amount of space that is kept in reserve for storing data unavailable to the user. After the manufacturer writes a servo pattern on the disk or disks in a disk drive, the manufacturer fixes the amount of space that is available to the user and the amount of space that is unavailable to the user. Servo writing the disks in the disk drive provides positional information for finding a particular track or group of tracks. The manufacturer then designates that a certain number of tracks will be set aside for a reserve area. The manufacturer may then write certain critical information to the tracks in the reserve area. The critical information is typically required to operate the disk drive and is used by the operating system or hardware in the operation of the drive. In the past, no one beyond the original disk drive manufacturer could access the reserve area. The reserve area was simply protected. The reserve area was even off limits to a computer system manufacturer that integrated the disk drive into a computer system. Thus, a computer system manufacturer could not modify or change the size of the reserve area. No such command or set of commands were available to allow anyone beyond the manufacturer of the disk drive to change anything with respect to the reserve area as set up by the manufacturer.

A disk drive is basically a nonvolatile source of memory. In other words, after the power is removed from the disk drive, the disk drive maintains the information stored thereon indefinitely. Recently, the storage capacity of disk drives has risen dramatically and the cost of that storage capacity, commonly priced as the cost per megabyte of disk drive storage has dropped dramatically. The result is that now disk drives have become an attractive alternative to nonvolatile storage utilizing ceramic chips or integrated circuits, since the cost of storage on a disk drive is much less expensive and since disk drives are already included in most computer systems.

The only option at present for computer system manufacturers seeking to write information to a disk rather than to a ROM, is to write to an area of the disk to which the user has access. This option is simply unacceptable in certain instances, since critical information written to this area of the disk could be overwritten at anytime. Overwriting would be the same as erasing the critical data written to the disk. Thus, overwriting or erasure could have devastating effects. For example, basic instructions necessary to operate the computer system could be erased, thereby leaving the user with useless hardware. In addition, viruses downloaded from other sources such as the Internet, could attack critical information written to a user accessible area. Although writing critical information to a disk is currently an attractive alternative from a perspective of cost, computer system manufacturers are discouraged from writing such information to a disk due to the possibility of overwriting any critical information written on the disk.

Therefore, there exists a need for a method and apparatus for modifying a reserve area of a disk drive.

SUMMARY OF THE INVENTION

The present invention teaches a method for expanding the reserve area of a disk drive to allow computer system manufacturers to change the storage capacity of the reserve area. Typically, the reserve area is not capable of being accessed by users or of being overwritten. The method may include setting up a password with the disk drive manufacturer to enable two commands. One command reads the maximum address or largest track number that the user has access to. The second command allows for setting a new maximum address to which the user has access. Preferably, the new maximum address is lower than or equal to the maximum address the original disk drive manufacturer initially fixed for the maximum address for user accessible data. This assures that the reserve area set up by the disk drive manufacturer is never accessible by the user and that the data written to the original reserve area will not be inadvertently erased thereby preserving information critical to the operation of the disk drive. This prevents partial or complete incapacitation of the disk drive.

Computer system manufacturers now realize that they can reduce the cost of systems without appreciably reducing reliability or quality of the computer system by reducing the size of nonvolatile read only memories (ROMs) and storing a portion of the information formerly stored in a ROM on the less expensive disk drive. In addition, other information may be written to the additional non user accessible reserve area to enhance the reliability and performance of the computer system. Once the two commands have been used to expand the reserve area, the computer system manufacturer may add critical data, and critical program instructions to the expanded or new reserve area. For example, the computer manufacturer may decide to store a portion of a virus scan program in the new reserve area, or a portion of the basic input output system (BIOS) so that a smaller BIOS read only memory (ROM) may be used for the computer system. Additionally, information such as restoration information, firmware updates, feature, boot option, operating system image, multi-language drives, BIOS, assistive application software, system software, diagnostic software, and the like may be stored in the expanded reserve area.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
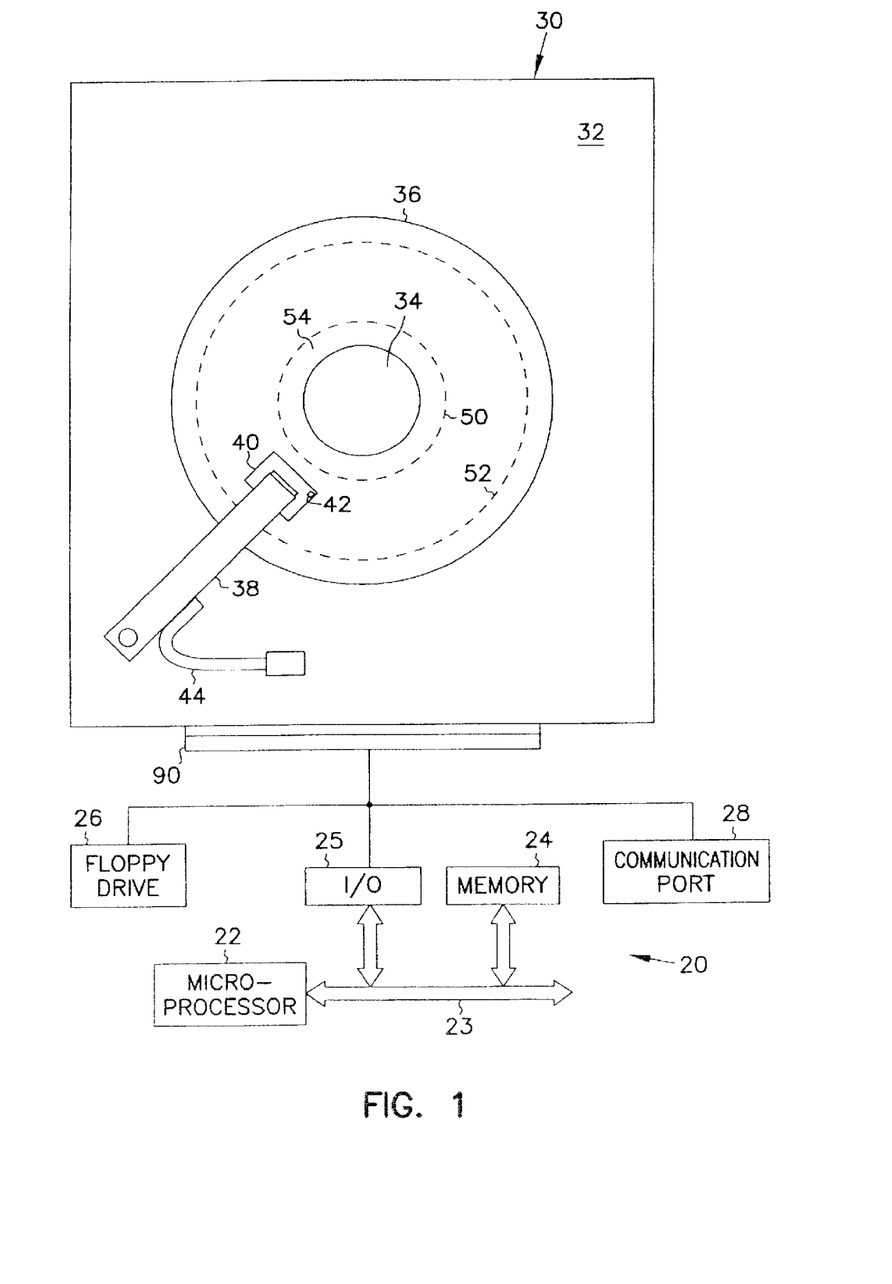
FIG. 1 is a schematic diagram of a computer system including a disk drive.

Referring now to FIG. 1, an exemplary embodiment of the present invention is shown wherein a computer system 20 includes a disk drive 30. The computer system 20 also comprises a microprocessor 22 having a data and instruction bus 23 for passing commands and data. A memory 24 and an input/output controller 25 are attached to the data and instruction bus 23. Attached to the input/output controller 25 is a floppy drive 26, a communications port 28 and a disk drive 30. The disk drive 30 shown is a hard or rigid disk drive. The rigid disk drive includes a housing 32 which typically includes a base plate and a cover which form a controlled environment called a disk enclosure. A spindle 34 is attached to the housing. Attached to the spindle 34 is a rigid disk 36. The spindle 34 is capable of rotation and rotates the disk 36 during operation. Also attached to the housing 32 is an actuator arm 38. In FIG. 1, the actuator arm is shown as rotatably attached to the housing 32, however, an actuator arm can also be attached to the housing 32 so that linear motion is achieved. Attached at the end of the actuator arm 38 is a slider 40 which carries a transducer 42. The slider 40 passes over the disk 36 and places the transducer in transducing relationship to the disk 36. The disk 36 includes a multiplicity of tracks which are typically invisible to the naked eye. The actuator arm 38 is moved and controlled to place the transducer 42 over a particular desired track and then maintain the transducer 42 over the desired track until desired information is read from or written to the desired track. In the case of reading information from the track on the disk 36, the transducer is electrically connected to circuitry 44 for amplifying the signal, decoding the signal and transferring the signal to a connector 90. The electrical circuitry 44 typically includes a circuit board which contains processing circuitry, firmware and other hardware.

An inner track 50 and an outer track 52 are shown as dotted concentric circles on the disk in FIG. 1, however tracks are typically invisible to the naked eye. The inner track 50 and the outer track 52 are just two of a multiplicity of tracks. The tracks located between the inner track 50 and the outer track 52 represent an area of the disk to which a user has access. The outer track is numbered track zero (track 0), the tracks are then numbered consecutively so that the higher numbered tracks are located closer to the center of the disk 36. It should be noted that when a disk drive contains more than one disk, the tracks that share the same number are at about the same distance from the center of the spindle. The tracks having the same number are then said to form a cylinder. The various tracks would be circles on the cylinder.

A reserve area 54, which the user can not access, may be located anywhere on the disk 36. The most common location for a reserve area is toward the center diameter of the disk inside of the inner track of the area to which the user has access. Accordingly, the reserve area 54 is shown inside the inner track 50 on the disk 36. The reason that this is the most common portion of the disk on which to have a reserve area is that these tracks hold the least amount of information per track. Since the inner tracks hold less data or information per track they are also in smaller increments. When adding information to the reserve area, the computer manufacturer will determine the size of the information they wish to add. Preferably, the capacity of all the added tracks for the reserve area will have to be equal to or greater than the size of information to be added to the reserve area. Typically, the computer system manufacturer will add tracks until the amount of storage capacity exceeds the size of the information to add. It should be noted that the tracks capable of holding more information are more valuable in terms of storage available to the user. The tracks capable of holding more information also occur in larger increments. Thus, if an additional track is needed to provide enough capacity to meet the capacity desired to be added to the new reserve area, using the tracks having smaller capacity will waste less capacity otherwise available for the user.

This invention provides a set of commands and a method to allow a computer system manufacturer to modify the size of the reserve area 54. The set of commands may be enabled by a password set up between the disk drive manufacturer and the computer system manufacturer. The password typically is a command that means nothing to the disk drive other than to allow execution of certain commands as discussed below. By executing the commands, the reserve area 54 may be expanded by reducing the highest track number to which the user has access. This effectively moves the inner band 50 away from the center of the disk 36 to make the reserve area 54 larger and make the portion of the disk accessible to the user (the area between the inner band 50 and the outer band 52) smaller.

In an exemplary embodiment, the two commands used are READ NATIVE MAX LBA/CYL command and the SET MAX LBA/CYL. The READ NATIVE MAX LBA/CYL command is akin to a status check of the current parameters that have been set for the disk drive. The READ NATIVE MAX LBA/CYL command is the request for the status information. The RESPONSE to this command includes the actual status.

The SET MAX LBA/CYL command is the command that requests a new or different maximum cylinder or logical block address. In other words, this is the command which resets the boundary between the user accessible area and the reserve area or negative cylinders to which the user does not have access.

In rare instances, the reserve area 54 can be reduced by increasing the highest track number to which the user has access. This effectively moves the inner band 50 toward the center of the disk 36 to make the reserve area 54 smaller and make the portion of the disk accessible to the user (the area between the inner band 50 and the outer band 52) larger. Of course it should be noted that the manufacturer of a disk drive sets up the size of the original reserve area and stores critical data in the original reserve area which is necessary to operate the disk drive. Thus, preferably the modifications will not reduce the size of the reserve area to an area that is smaller than the original reserve area as set up by the manufacturer of the disk drive. This prevents overwriting of critical information written to the original reserve area by the original equipment manufacturer.

Two commands are enabled with a password which is set up between the disk drive manufacturer and the computer system manufacturer. Typically the computer system manufacturer must specify the type of password which is to be recognized. It may be preferable to include this password as part of the system BIOS. Thus, as the drive firmware reduces the capacity by a predetermined area, and drive firmware reports back to a BIOS or OS driver that it is unaware of the special commends needed to gain access to this area. An operating system like Windows (9X, NT) Liniux, and the like is entirely unaware of the hidden area and cannot access it without special drivers. Therefore, in this embodiment, only the system BIOS is aware of this are and knows the hard drive commands, such as IDE commands, to access it. In this way, access to the reserve area may be controlled by the BIOS to limit unwanted user actions.

Figure 2A:
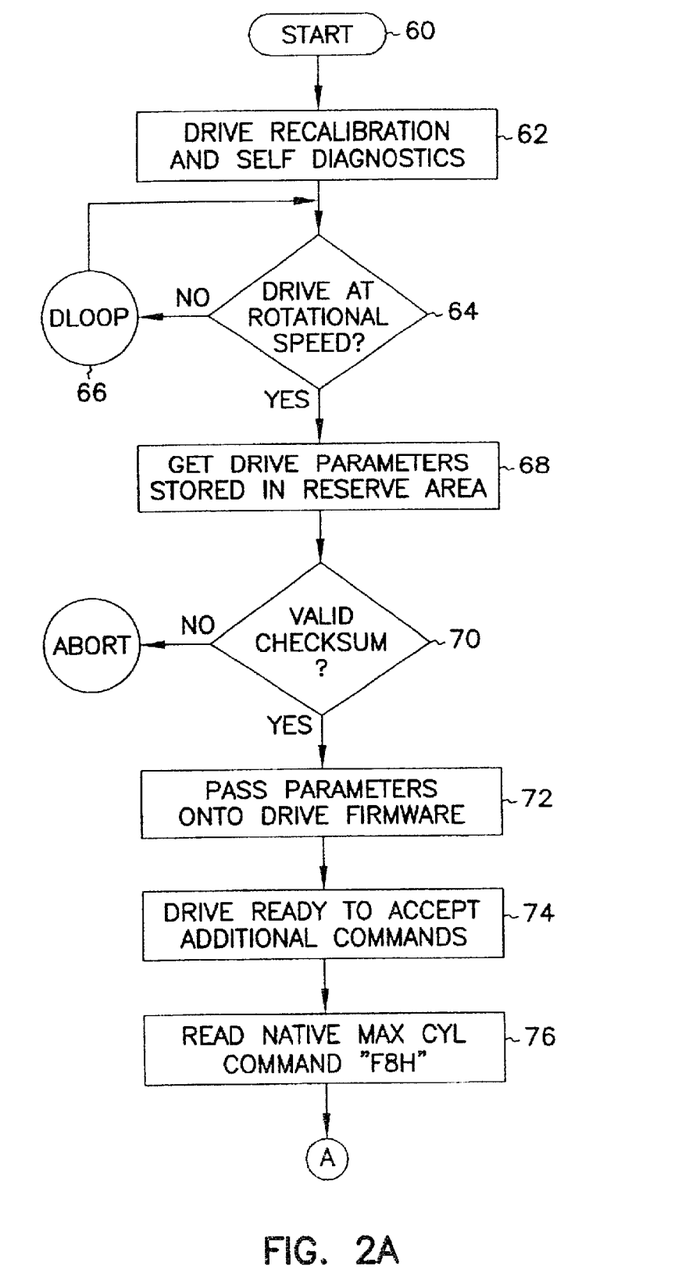
FIGS. 2A and 2B are flow charts of the operation of the disk drive as the disk drive executes commands to expand the reserve area on the disk drive.

Now turning to FIGS. 2A and 2B, exemplary steps utilized to implement this invention will be described in more detail with the aid of the flowchart shown in these figures.

The disk drive 30 is started as depicted by step 60. Once started, the drive goes through drive recalibration and a series of self diagnostics, as depicted by step 62, to test itself and then as the drive warms up, the drive recalibrates various settings within the drive, such as position error signals and other such features. Once the drive has gone through its self diagnostics and recalibration, the drive checks its rotational speed at decision box 64. If the drive is not at its rotational speed, the drive does a loop 66 and rechecks the rotational speed. The loop is depicted by a circle 66 in the flow chart. Once the disk drive has achieved rotational speed, the drive gets the drive parameters that are stored in the negative cylinders or the reserve area, as depicted by box 68. An additional sum, called a checksum, is calculated and stored with the original disk drive parameters. Upon reading the original parameters, the checksum is then recalculated and compared to the original checksum. If the checksum is valid, as depicted by decision box 70, the drive parameters are passed onto the drive firmware as depicted by box 72. Once the drive parameters are passed onto the drive firmware, the drive is ready to accept additional commands as shown in step 74 of the flow chart. Firmware is that part of software that usually cannot be easily changed. Firmware consists of microprograms that are contained in ROM. Typically, firmware tends to be configured for specific hardware and offers software-type implementation techniques for that hardware. Firmware is generally limited to moving data through the data paths and functional units already present; and is able to effectively process only the instruction formats, data types, and arithmetic modes that are defined for the specific hardware for which it is written.

The additional command that is accepted is Read Native Max Cylinder (READ NATIVE MAX LBA/CYL) which is identified by the hexadecimal form of an F and an 8 as shown in box 76 of the flow chart. The command is checked for validity to see if the command is supported by the disk drive's hardware and firmware at decision box 78. If it is not supported, the operation aborts. If it is supported and it is a valid command, the disk drive returns the drive parameters to the host computer as shown in box 80. The drive parameters are returned in the RESPONSE to the READ NATIVE MAX LBA/CYL. The particulars of these commands will be discussed with respect to FIGS. 3–6.

Another command, as depicted by Box 82, which is issued is the Set Max Cylinder command invoked by the hexadecimal F9. This is the command used to set a new maximum cylinder or track number. A reduction in the maximum track number reduces the area to which users have access and increases the reserve area to which the users do not have access. This command is checked for validity at decision box 84. If the command is invalid, the operation aborts. If the command is valid and it is supported by the disk drive's hardware and firmware, the new parameters are passed to the drive firmware as shown in box 86.

The computer system manufacturer may load other information into the reserve area which is not user accessible to utilize the reserve area as inexpensive nonvolatile storage. Such information may comprise data and programs. Any information or sets of instructions may be loaded into the added reserve area. Some of the uses include adding a portion of the BIOS (Basic Input Output System) to the enlarged reserve area. BIOS is usually stored in other nonvolatile hardware such as a BIOS RAM. By off loading some of the BIOS to the reserve area, a smaller capacity, nonvolatile RAM can be used in the computer system. This saves manufacturers and users money since the nonvolatile disk drive space is less expensive than nonvolatile RAM. It should be apparent that a wide variety of information, such as data and program instructions may be stored in the reserve area without departing from the spirit and scope of the present invention, the following embodiments are discussed as exemplary in nature to aid in the description of the present invention.

Another additional use of the added reserve area comprises storing emergency boot up instructions. The boot up instructions are those necessary to start up a computer system. These are typically stored on a floppy or a hard disk. More common is to store these on a hard disk drive. If the disk of the hard disk drive gets damaged in the area where the boot up instructions are located, then the emergency boot up instructions in the reserve area can be used. Previously, users had to look for the floppy disks that held the boot-up instructions before they could get restarted. If it is necessary to use the emergency boot up instructions, the disk drive indicates such necessity to the host. Such necessity also indicates that there may have been some disk damage.

Another use of the added reserve area is for storing virus scan or virus detection software. With virus scanning or detecting software in the reserve area and therefore resident on the disk, the disk drive hardware or firmware checks for viruses periodically or after a certain amount of time after having not received a command. In an alternative embodiment, the system scans files before they are saved to the disk. In yet a further embodiment predictive failure information is added by the computer system or to the added reserve area 54.

A further use of the added reserve area is for storing restoration information. Restoration information may be utilized to restore computer system factory settings, such as drivers, files, and the like, in the case of loss of the factory settings due to failure of the system, such as hard drive failure and the like. Typically, restoration information is supplied on a removable medium, such as a floppy disk or compact disk read-only-memory (CD-ROM), to be installed by a user in case of failure. However, these disks may become lost, thereby requiring the user to order an additional medium, download the necessary files on another computer system, and the like. Thus, by providing restoration information in the added reserve area 54 on a hard disk drive, a BIOS call may be utilized to restore the computer system in case of failure, corruption, and the like. Further, by providing the restoration information in the reserve area, not only is the cost of a CD-ROM eliminated, but client care support would be improved, as well as factory support and the like. For example, improved client care support could result from the faster access time enabled by storing the information on the hard drive versus the time required to read the information from a CD-ROM. Factory support may be improved by eliminated the need of boot floppies during download. This will speed up the download and increase the number of systems per cell. Further, it could eliminate the testing of drives and free the space, since only bad drives should come back from the field.

The present invention may be implemented utilized a variety of methods. For example, a hot key may be utilized to access the reserved area. Password protection may also be utilized so that only the system BIOS access is allowed. Multiple services may also be supported by the reserve area. For instance, system level diagnostics may be stored in the reserve area, as well as restoration information, and the like as contemplated by a person of ordinary skill in the art may utilize the reserve area. For example, the firmware may be updated by permitting access to the reserve area by a computer system manufacturer, yet still ensure the integrity of the information by blocking access to the reserve area for all other users.

Additionally, a unique code may be assigned to every feature, a unique code to every firmware change at the time the drive is manufactured, or at the time the drive is going through the service center. Preferably, the unique codes are suitable for being updated by a vendor during production or at the service center. Thus, the vendor and the computer system manufacturer may be save both time and money. Preferably, a vendor special signature that is encrypted is included within the data so that only vendor drives have this signature. Thus, the signature may be matched with another signature on the drive itself before loading new software, such as a new firmware.

Further the reserve area may be split into multiple areas. For example, the reserve area may be split into three areas. A first area for disk drive manufactures to store the firmware and features that is prohibited to others, such as the computer manufacturer and the like. A second area may be used by OEM or computer manufacturing to store boot options, OS image, multi-language drives, BIOS's, assistive application software to help customer support to copy and manage files, and the like. A third area may include a generic area for system and diagnostic software. Thus, a general command or password may be utilized to invoke the reserve area and sub-commands may be used to access each of the different sub-areas. Preferably, the sub-commands are vendor unique to insure the integrity of the data contained in each area. Although the use of three subareas are discussed, it should be apparaent that other numbers of subareas may be utilized as contemplated by a person of ordinary skill in the art without departing from the spirit and scope of the present invention.

Referring generally now to FIGS. 3–10, an exemplary embodiment of the present invention will be described wherein detail of the READ NATIVE MAX LBA/CYL and the SET MAX LBA/CYL commands and the responses to these commands is discussed. It should be noted at the outset, that all these commands and the responses thereto are in a format specifically required for a drive that operates with a standard IDE interface. Specifically, the commands are known as ATA commands. In other words, passing the commands and responses across an industry standard interface dictates that the commands are of a specific format which is dictated by the industry standard for ATA commands. One of ordinary skill in art could adapt these commands to use other industry standard interfaces such as SCSI, or SCSI II. The ATA command format is for the IDE drives, and is set forth here merely as an illustrative example with respect to other formats.

Figure 3:
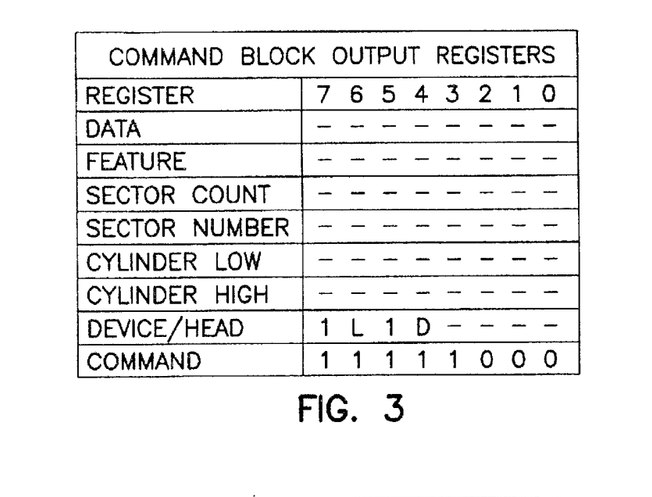
FIG. 3 is a block diagram illustrating the fields of a read native max command.

READ NATIVE MAX LBA/CYL Command:

Now turning specifically to FIG. 3, the details of the READ NATIVE MAX LBA/CYL command will be discussed. There are commands that govern AT attachment which are known as the ATA commands. Communication to or from any device, such as this disk drive, is through an I/O Register that routes the input or output data to or from registers associated with the ATA command block. The Command Block Registers are used for sending commands to the device or posting status from the device. The Control Block Registers are used for device control and to post alternate status. The command block registers include ten, 8-bit registers. The ten registers are for DATA, FEATURE, SECTOR COUNT, SECTOR NUMBER. CYLINDER LOW, CYLINDER HIGH, DEVICE/HEAD, COMMAND, STATUS, AND ERROR.

ATA commands being written to devices and status being read from the devices is done through ten 8-bit registers that form the ATA Command Block. Each register is addressed by using the signals from the host (CSO-, CS1-, DA2, DA1, DA0, DIOR- and DIOW-). When writing a command to a device, the contents that have been written to the Data, Features, Sector Count, Sector Number, Cylinder Low, Cylinder High and Device/Head registers are treated as parameters of the command that is written to the Command register. Command processing begins when the Command register is written to. All the registers, except the command register, act as parameters for the command. Basically, the parameters are set first and then the command is issued.

The details of the READ NATIVE MAX ADDRESS command will be discussed. For this command, the Data, Features, Sector Count, Sector Number, Cylinder Low and Cylinder High registers are not used and therefore, do not need to be initialized. The command (F8h) is written to the Command register after first writing a value into the Device/Head register. The value written to the Device/Head register indicates which device should respond to the command and whether the MAXADDRESS returned should be reported as an LBA (Logical Block Address) value or as a CHS (Cylinder-Head-Sector) value.

The DEVICE/HEAD register defines which drive (slave or master) and the mode in which the drive operates (LBA mode is Logical Block Address Mode). All eight bits of the 8-bit COMMAND register specify the command. The first four bits of the COMMAND for the READ NATIVE MAX LBA/CYL command are 1111. The second four bits COMMAND for the READ NATIVE MAX LBA/CYL command are 1000. Four bits can be arranged in sixteen different ways which gives rise to the term hexadecimal. The hexadecimal which historically is equal to a "fox" or F is the combination with a 1111. The hexadecimal which historically is equal to a 8 is the combination with a 1000. Two hexadecimals define an eight bit register. The first four of the COMMAND for the READ NATIVE MAX LBA/CYL command equal the hexadecimal F and the last four equal the hexadecimal 8. Thus, the command is termed an F8 command.

Figure 2B:
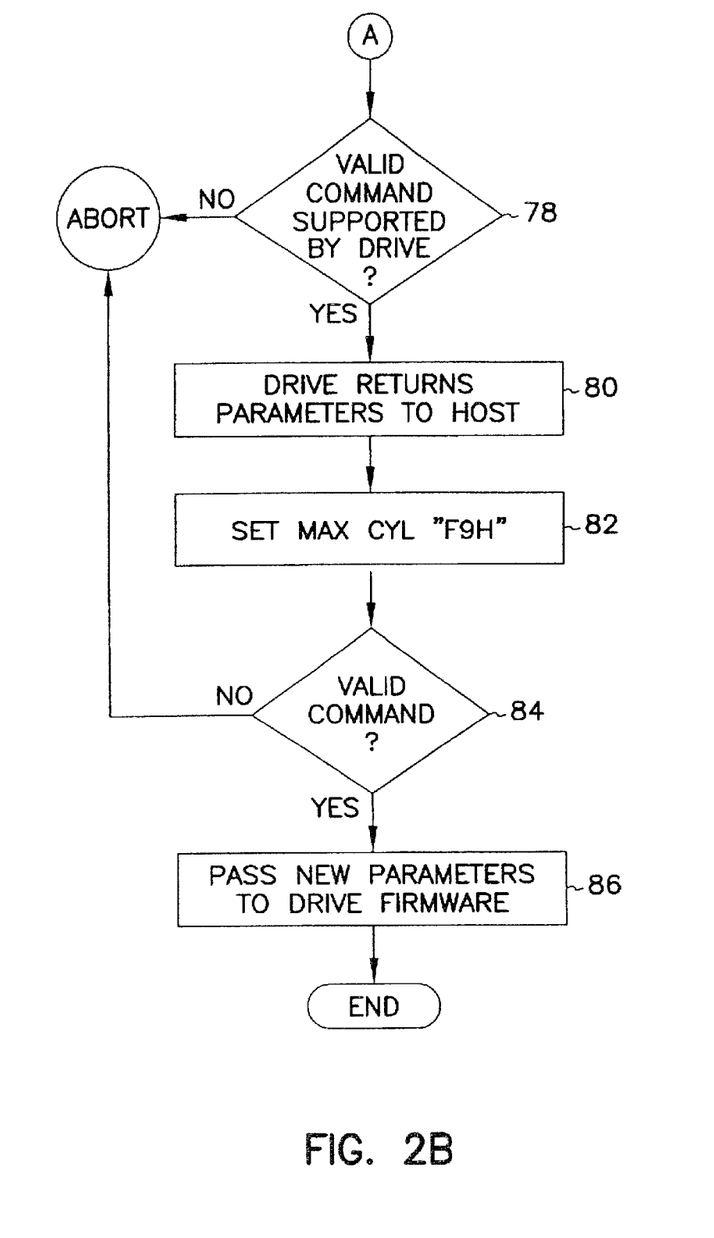
Figure 4:
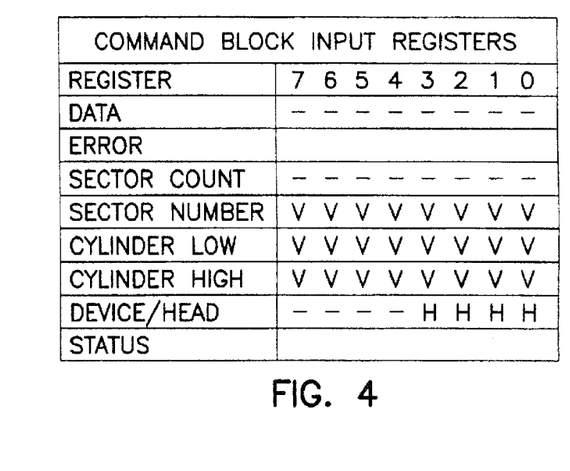
FIG. 4 is a block diagram illustrating the fields of a response to the read native max command.

RESPONSE TO THE READ NATIVE MAX LBA/CYL command:

If the READ NATIVE MAX LBA/CYL command is considered valid, the drive returns the parameters to the host, as shown in step 80 of FIG. 2B. The returned parameters are set forth in the RESPONSE TO THE READ NATIVE MAX LBA/CYL. The RESPONSE TO THE READ NATIVE MAX LBA/CYL command is in the format of any ATA command block which is a matrix of eight, 8-bit registers. Each 8-bit register is not used in the RESPONSE TO THE READ NATIVE MAX LBA/CYL command. As shown in FIG. 4, the command block for the RESPONSE TO THE READ NATIVE MAX LBA/CYL includes eight, 8-bit registers for DATA, ERROR, SECTOR COUNT, SECTOR NUMBER, CYLINDER LOW, CYLINDER HIGH, DEVICE/HEAD, and STATUS.

The 8-bit registers for DATA, ERROR, SECTOR COUNT are not used in the RESPONSE TO THE READ NATIVE MAX LBA/CYL command returned to the host. The host reads the parameters from the 8-bit registers for the SECTOR NUMBER, CYLINDER LOW, CYLINDER HIGH, and the last four bits of the DEVICE/HEAD register. The values are typically ones and zeros that convey a particular Sector Number, a particular cylinder for Cylinder Low and a particular cylinder for Cylinder High and MAX HEAD Number.

Once the max LBA/CYLINDER parameters are obtained, the device or disk drive places the parameters into the 8-bit registers for SECTOR NUMBER, CYLINDER HIGH, CYLINDER LOW, and DEVICE/HEAD. Once these parameters are in these registers, the status bit indicating that the command is complete and the DMA is ready is then set. The host then reads the parameters from the registers.

The ERROR REGISTER/Field

Figure 5:
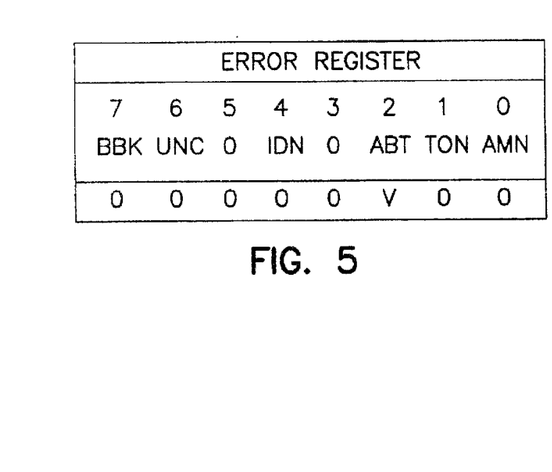
FIG. 5 is a block diagram illustrating the fields for an error register in the response to the read native max command.

The ERROR register is used in the RESPONSE TO THE READ NATIVE MAX LBA/CYL command when an error is detected while executing the command. The error register is shown blank in FIG. 4. In actuality, the error register shown in FIG. 4 may be filled. The error register is an 8 bit register. Each bit of the 8 bit register indicates a specific error as shown in FIG. 5. Each of the bits in the registers of the error register indicates a particular type of error.

The STATUS REGISTER/Field

Figure 6:
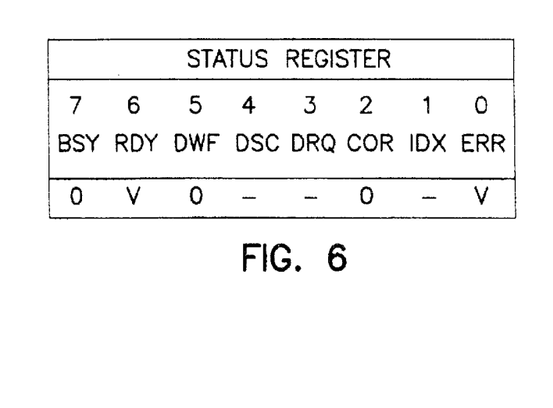
FIG. 6 is a block diagram illustrating the fields for a status register in the response to the read native max command.

The STATUS register is another 8 bit register as shown in FIG. 6. The bits in status register change while the RESPONSE TO THE READ NATIVE MAX LBA/CYL command are filled and changed while different parameters in the other registers are being filled. As mentioned above, the host polls the status with respect to fulfilling the command and the bits in the 8 bit STATUS register convey this information. The 8 bit status register is shown blank in FIG. 4, but is detailed in FIG. 6. Each of the bits in the STATUS REGISTER indicates the type of status as is shown in FIG. 6.

Listed below are various parameters associated with the READ NATIVE MAX LBA/CYL command and the RESPONSE TO THE READ NATIVE MAX LBA/CYL command. The parameters associated with the READ NATIVE MAX LBA/CYL command are listed as Output Parameters to the Drive.

The parameters associated with the RESPONSE TO THE READ NATIVE MAX LBA/CYL command are the remaining parameters listed. Specifically, the parameters associated with the RESPONSE TO THE READ NATIVE MAX LBA/CYL, command are the Input Parameters from the Drive, parameters associated with the Error Registers, and parameters associated with the Status registers.

Output Parameters to the Drive

L LBA mode. Indicates the addressing mode. L=0 specifies CHS mode and L=1 does LBA addressing mode.
D Drive. When D=0, Drive 0 (Master) is selected. When D=1, drive 1 (Slave) is selected.
V Valid. Indicates that the bit is part of an output parameter and should be specified.
— Indicates that the bit is not used.

Input Parameters From The Drive

Sector Number In LBA mode, This register contains Native Max LBA bits 0–7. (L=1) In CHS mode, this register contains Native Max sector number. (L=0)
Cylinder High/Low In LBA mode, this register contains native Max LBA bits 8–15 (low), 16–23 (high), (L=1) In CHS mode, this register contains native max cylinder number. (L=0)
DEVICE/HEAD In LBA mode, this register contains native Max LBA bits 24–27. (L=1) In CHS mode, this register contains native max head number. (L=0)
V Valid, indicates that the bit is part of an output parameter and should be specified.
— Indicates that the bit is not used.

Error Registers

ABT Aborted command, ABT=1 indicates the requested command has been aborted due to a drive status error or an invalid parameter in an output register.

Status Registers

RDY Drive ready, RDY=1 indicates that the drive is capable of responding to a command, RDY will be set to 0 during power on until the drive is ready to accept a command. If the drive detects an error while processing a command, RDY is set to 0 until the status register is read by the Host, at which time RDY is set back to 1.
ERR Error, ERR=1 indicates that an error occurred during execution of the previous command. The Error Register should be read to determine the error type. The drive sets ERR=0 when the next command is received from the Host.

Once the RESPONSE TO THE READ NATIVE MAX LBA/CYL command is received by the host, the SET MAX CYL command may be issued by the host to the disk drive.

SET MAX CYL Command

Once the RESPONSE TO THE READ NATIVE MAX LBA/CYL command is received by the host, the SET MAX LBA/CYL command may be issued by the host to the disk drive. This command set overwrites the maximum logical block address or maximum cylinder (LBA/CYL) of the disk drive to reset the drive capacity available to the user and increase or decrease the reserve space or the capacity unavailable to the user. Once the command is received and the drive parameters are modified, then all accesses beyond the maximum logical block address or cylinder (LBA/CYL) of the disk drive are rejected by setting an abort bit which is one of the 8 bits in the Error Register (shown in FIG. 9).

Figure 7:
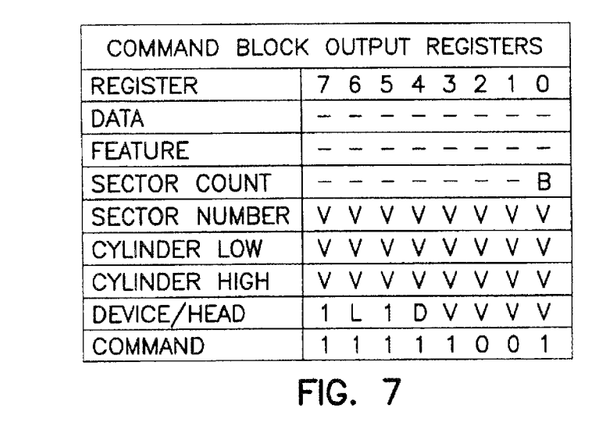
FIG. 7 is a block diagram illustrating the fields of a set max LBA/CYL command.

Now turning specifically to the exemplary embodiment shown in FIG. 7, the details of the SET MAX CYL command will be discussed. As mentioned before with respect to the Read Native Max command, there are commands that govern AT attachment which are known as the ATA commands. Communication to or from any device, such as this disk drive, is through an I/O Register that routes the input or output data to or from registers associated with the ATA command block. The Command Block Registers are used for sending commands to the device or posting status from the device. The Control Block Registers are used for device control and to post alternate status. The command block registers include ten, 8-bit registers. The ten registers are for DATA, FEATURE, SECTOR COUNT, SECTOR NUMBER, CYLINDER LOW, CYLINDER HIGH, DEVICE/HIEAD, COMMAND, STATUS, AND ERROR.

ATA commands being written to devices and status being read from the devices is done through ten 8-bit registers that form the ATA Command Block. Each register is addressed by using the signals from the host (CSO-, CS1-, DA2, DA1, DAO, DIOR- and DIOW-). When writing a command to a device, the contents that have been written to the Data, Features, Sector Count, Sector Number, Cylinder Low, Cylinder High and Device/Head registers are treated as parameters of the command that is written to the Command register. Command processing begins when the Command register is written to. All the registers, except the command register, act as parameters for the command. Basically, the parameters are set first and then the command is issued.

The details of the SET MAX CYL command will now be discussed. For this command the DATA and FEATURE registers are not used and therefore, do not need to be initialized. The SECTOR COUNT, SECTOR NUMBER, CYLINDER LOW, and CYLINDER HIGH are each 8-bit registers used to set the parameters of the SET MAX CYL command. The bits in these 8-bit registers are set before the SET MAX CYL command is run. The bits of the SECTOR COUNT, SECTOR NUMBER, CYLINDER LOW, and CYLINDER HIGH are used in the SET MAX CYL command to specify the value of the new highest cylinder to which the user has access. The DEVICE/HEAD register is used to define the type of drive (slave or master) and the mode in which the drive operates (LBA mode is Logical Block Address Mode). One bit of the SECTOR COUNT register is used to indicate whether the selection will be nonvolatile or volatile. In other words, if this is a temporary selection or a permanent selection.

All eight bits of the 8-bit COMMAND register are used to specify the command. The first four bits of the COMMAND for the SET MAX CYL command are 1111. The second four bits of the COMMAND for the SET MAX CYL command are 1001. Four bits or fields can be arranged in sixteen different ways which gives rise to the term hexadecimal. The hexadecimal which historically is equal to a "fox" or F is the combination with a 1111. The hexadecimal which historically is equal to a 9 is the combination with a 1001. Two hexadecimals define an eight bit register. The first four bits in the 8-bit COMMAND register for the SET MAX CYL command equal the hexadecimal F and the second four bits the 8-bit COMMAND register for the SET MAX CYL command equal the hexadecimal 9. Thus, the SET MAX CYL command is termed an F9 command.

RESPONSE TO THE SET MAX CYL Command

Figure 8:
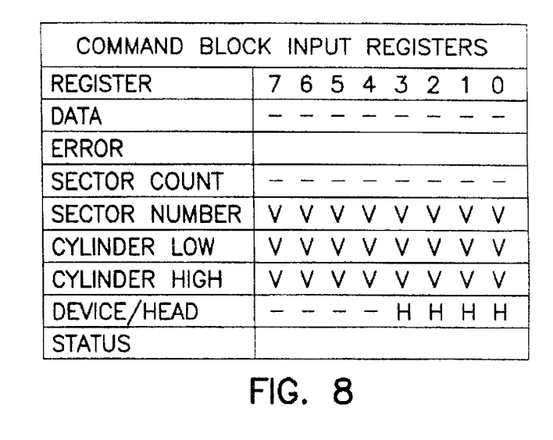
FIG. 8 is a block diagram illustrating the fields of a response to the set max LBA/CYL command.

If the SET MAX CYL command is considered valid, the new parameters are passed to the firmware of the disk drive device. The disk drive device returns the parameters to the host, as shown in step 80 of FIG. 2B. The returned parameters are set forth in the RESPONSE TO THE SET MAX CYL command. The RESPONSE TO THE SET MAX CYL command is in the format of any ATA command block which is a matrix of eight, 8-bit registers. As shown in FIG. 8, the command block input registers for the RESPONSE TO THE SET MAX CYL command include eight, 8-bit registers called DATA, ERROR, SECTOR COUNT, SECTOR NUMBER, CYLINDER LOW, CYLINDER HIGH, DEVICE/HEAD, and STATUS.

Bits in the DATA, ERROR, SECTOR COUNT registers are not used to set parameters for the RESPONSE TO THE SET MAX CYL command and therefore are not initialized. The drive parameters are conveyed by bits in the SECTOR NUMBER, CYLINDER LOW, CYLINDER HIGH, and DEVICE/HEAD 8-bit registers. The bits in these 8-bit registers convey the parameters for a particular Sector Number, a particular cylinder for Cylinder Low and a particular cylinder for Cylinder High. The bits of the DEVICE/HEAD register are used to convey parameters about the type of drive (slave or master) and the mode in which the drive operates (LBA mode is Logical Address Block mode).

The ERROR REGISTER/Field

Figure 9:
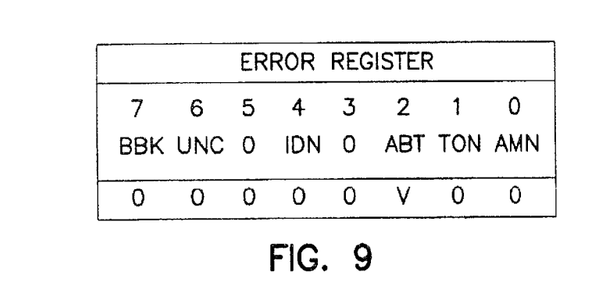
FIG. 9 is a block diagram illustrating the fields for the error register in the response to the set max LBA/CYL command.

Bits in the 8-bit ERROR Register may also be used in the event an error is detected. The last four bits of the ERROR Register are used when an error is detected while executing the SET MAX LBA/CYL command. The ERROR Register is not shown in FIG. 7, but are detailed in FIG. 9. Each of the bits in the ERROR Register indicates the type of error as is shown in FIG. 9.

The STATUS REGISTER/Field

Figure 10:
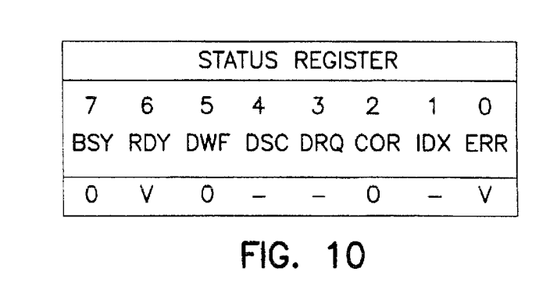
FIG. 10 is a block diagram illustrating the fields for the status register in the response to the set max LBA/CYL command.

Bits in the 8-bit STATUS register change while the RESPONSE TO THE SET MAX LBA/CYL command is being filled and as different parameters in other registers are being filled. The host polls the STATUS register as the command is being filled. The bits in the 8-bit STATUS register convey information about which of the parameters has returned and if all the parameters necessary to fulfill the RESPONSE TO THE SET MAX LBA/CYL command have been returned. The 8-=bit STATUS register is shown blank in FIG. 7, but is detailed in FIG. 10. Each of the bits in the STATUS register indicates the type of status as is shown in FIG. 10.

Once the SET MAX LBA/CYL command is received and the drive parameters are modified, then all access attempts beyond the Logical Block Address or Cylinder designated by this command are rejected. Upon rejecting the access a bit in the ERROR register indicates an abort.

Listed below are various parameters associated with the SET MAX LBA/CYL command and the RESPONSE TO THE SET MAX LBA/CYL command. The parameters associated with the SET MAX LBA/CYL command are listed as Output Parameters to the Drive.

The parameters associated with the RESPONSE TO THE SET MAX LBA/CYL command are the remaining parameters listed. Specifically, the parameters associated with the RESPONSE TO THE SET MAX LBA/CYL command are the Input Parameters from the Drive, parameters associated with the Error Registers, and parameters associated with the Status registers.

Output Parameters to the Drive

B Option bit for selection whether nonvolatile or volatile. B=1 is volatile condition, when B=1, Max LBA/CYL which is set by SET MAX LBA/CYL command is preserved by POR, HARD RESET and SOFT RESET. When B=0, MAX LBA/CYL which is set by SET MAX LBA/ CYL command will be lost by POR, HARD RESET and SOFT RESET.

Sector Number In LBA mode, this register contains LBA bits 0–7 which is to be set. (L=1) In CHS mode, this register is ignored. (L=0)

Cylinder High/LOW In LBA mode, this register contains LBA bits 8–15 (low), 16–23 (high) which is to be set, (L=1) In CHS mode, this register contains cylinder number which is to be set, (L=0)

DEVICE/HEAD In LBA mode, this register contains LBA bits 24–27 which is to set (L=1) In CHS mode, this register is ignored. (L=0)

L LBA mode, indicates the addressing mode, L=0 specifies CHS mode and L=1 does LBA addressing mode.

D Drive. When D=0, the drive 0 (master) is selected, when D=1 drive 1 (slave) is selected.

V Valid. Indicates that the bit is part of an output parameter and should be specified.

— Indicates that the bit is not used.

Input Parameters From The Drive

Sector Number In LBA mode, this register contains max LBA bits 0–7 which is set. (L=1) In CHS mode, this register contains max sector number. (L=0)

Cylinder High/Low In LBA mode, this register contains max LBA bits 8–15 (Low), 16–23 (HIGH) which is set. (L=1) In CHS mode, this register contains max cylinder number which is set. (L=0)

DEVICE/HEAD In LBA mode, this register contains max LBA bits 24–27 which is set. (L=1) In CHS mode, this register contains max head number. (1=0)

V Valid. Indicates that the bit is part of an output parameter and should be specified.

— Indicates that the bit is not used.

Error Registers

ABT Aborted command. ABT=1 indicates the requested command has been aborted due to a drive status error or an invalid parameter in an output register.

Status Registers

RDY Drive ready. RDY=1 indicates that the drive is capable of responding to a command. RDY will be set to 0 during power on until the drive is ready to accept a command. If the drive detects an error while processing a command, RDY is set to 0 until the Status Register is read by the Host, at which the RDY is set back to 1.

ERR Error. ERR=1 indicates that an error occurred during execution of the previous command. The Error Register should be read to determine the error type. The drive sets ERR=0 when the next command is received from the host.

Access to the Reserve Area

In an exemplary embodiment of the present invention, access to the reserve area may be accomplished in two stages. A user may press a key, such as an "F9" key, or when attempting to boot from all the devices listed in the setup BOOT menu fails. A menu may then be present to the user to enable the user to select a desired option, such as running system diagnostics, reloading a drive, performing a complete operating system restoration, and the like. The BIOS may then issue commands to the drive, which may include a code such as a password so that a hacker utility that knows the commands cannot gain access, resize the drive to allow access, and the like. A predetermined size area at the end of the disk may be formatted and made bootable like a floppy or CD-ROM. Thus, a warm boot may be performed and normal program flow resumed.

At the drive level, the Tidentify drive command supports/defines the following:

Identify Drive Command

Word 82 Bit 10 1=Host protected area set supported
Word 83 bit 8 1=Set MAX security extension supported
Once the reserve area is set the following bits are set to 1.

Word 85 bit 10 1=host protected area feature set enable
Word 86 bit 8 1=set max security extension enabled by SET MAX SET PASSWORD It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for allocating resources in a disk drive having a user accessible area, a reserve area, and a boundary between the user accessible area and the reserve area, comprising:

reading a capacity of the disk drive accessible to the user; and resetting the boundary between the user accessible area and the reserve area so as to increase the reserve area; and inputting information to the increased reserve area, wherein the inputted information includes restoration information.

2. The method as described in claim 1, wherein the reserve area is increased, the user accessible area is decreased.

3. The method as described in claim 1, wherein the boundary includes a maximum address that the user has access to.

4. The method as described in claim 1, wherein the inputted information includes at least one of data and program instructions.

5. The method as described in claim 1, wherein the inputted information is non user accessible information.

6. The method as described in claim 1, wherein the inputted information includes virus information.

7. The method as described in claim 1, wherein the inputted information includes predictive failure information.

8. The method as described in claim 7, wherein the predictive failure information includes information to predict disk drive failure.

9. The method as described in claim 1, wherein the inputted information includes a portion of the basic input/output system (BIOS).

10. The method as described in claim 1, wherein the inputted information includes emergency boot instructions.

11. The method as described in claim 1, wherein the inputted information includes information traditionally stored in ROM.

12. The method as described in claim 1, wherein the inputted information includes system level diagnostic information.

13. The method as described in claim 1, wherein the reserve area includes a plurality of sub-areas.

14. The method as described in claim 13, wherein the reserve area includes a first subarea suitable for access by a disk drive manufacturer, a second subarea suitable for access by a computer manufacturer, and a third subarea suitable for use as a generic area.

15. The method as described in claim 1, wherein the reserve area is suitable for being accessed by at least one of a hot key utilized to access the reserved area and a password utilized so that only system BIOS access is allowed.

16. The method as described in claim 1, wherein a unique code is included in the reserve area so as to enable access to the reserve area.

17. The method as described in claim 16, wherein the unique code is matched with a signature included with the information so as to able the information to be stored in the reserve area.

18. The method as described in claim 1, wherein the information includes at least one of firmware update, feature, boot option, operating system image, multi-language drives, BIOS, assistive application software, system software, and diagnostic software.

19. A method for modifying the size of a reserve area in a disk drive, said disk drive including a predetermined reserve storage area suitable for storing selected non-user accessible information, said reserve storage area having a predetermined storage capacity, said disk drive also including a user accessible area having a predetermined storage capacity, comprising:

reading the capacity of the user accessible area; and resetting the capacity of the user accessible area, wherein capacity of the user accessible area is reduced and the capacity of the reserve area is increased thereby permitting additional information to be stored in the reserve area, wherein the additional information includes system level diagnostic information.

20. The method as described in claim 19, wherein the additional information includes at least one of data and program instructions.

21. The method as described in claim 19, wherein the additional information is non user accessible information.

22. The method as described in claim 19, wherein the additional information includes virus information.

23. The method as described in claim 19, wherein the additional information includes predictive failure information.

24. The method as described in claim 23, wherein the predictive failure information includes information to predict disk drive failure.

25. The method as described in claim 19, wherein the additional information includes a portion of the basic input/output system (BIOS).

26. The method as described in claim 19, wherein the additional information includes emergency boot instructions.

27. The method as described in claim 19, wherein the additional information includes information traditionally stored in ROM.

28. The method as described in claim 19, wherein the additional information includes restoration information.

29. The method as described in claim 19, wherein the reserve area includes a plurality of sub-areas.

30. The method as described in claim 29, wherein the reserve area includes a first subarea suitable for access by a disk drive manufacturer, a second subarea suitable for access by a computer manufacturer, and a third subarea suitable for use as a generic area.

31. The method as described in claim 19, wherein the reserve area is suitable for being accessed by at least one of a hot key utilized to access the reserved area and a password utilized so that only system BIOS access is allowed.

32. The method as described in claim 19, wherein a unique code is included in the reserve area so as to enable access to the reserve area.

33. The method as described in claim 32, wherein the unique code is matched with a signature included with the information so as to able the information to be stored in the reserve area.

34. The method as described in claim 19, wherein the information includes at least one of firmware update, feature, boot option, operating system image, multi-language drives, BIOS, assistive application software, system software, and diagnostic software.

35. A method for changing the size of a reserve area in a disk drive, said disk drive including a predetermined reserve storage area suitable for storing selected non-user accessible information, said reserve storage area having a predetermined storage capacity, said disk drive also including a user accessible area having a predetermined storage capacity, comprising:

checking a status of at least one parameter of the disk drive, the parameter including at least one of the predetermined storage capacity of the user accessible area and a maximum track to which a user has access; and resetting a boundary between the user accessible area and the reserve storage area to at least one of increase and decrease the reserve storage area, wherein the reserve storage area includes non-user accessible information previously stored in a first amount, the reserve storage area is not decreased past that first amount.

36. The method as described in claim 35, further comprising inputting information to the increased reserve storage area on the disk drive.

37. The method as described in claim 36, wherein the inputted information includes at least one of data and program instructions.

38. The method as described in claim 36, wherein the inputted information is non user accessible information.

39. The method as described in claim 36, wherein the inputted information includes virus information.

40. The method as described in claim 36, wherein the inputted information includes predictive failure information.

41. The method as described in claim 40, wherein the predictive failure information includes information to predict disk drive failure.

42. The method as described in claim 36, wherein the inputted information includes a portion of the basic input/output system (BIOS).

43. The method as described in claim 36, wherein the inputted information includes emergency boot instructions.

44. The method as described in claim 36, wherein the inputted information includes information traditionally stored in ROM.

45. The method as described in claim 36, wherein the inputted information includes restoration information.

46. The method as described in claim 36, wherein the inputted information includes system level diagnostic information.

47. The method as described in claim 36, wherein the reserve area includes a plurality of sub-areas.

48. The method as described in claim 47, wherein the reserve area includes a first subarea suitable for access by a disk drive manufacturer, a second subarea suitable for access by a computer manufacturer, and a third subarea suitable for use as a generic area.

49. The method as described in claim 36, wherein the reserve area is suitable for being accessed by at least one of a hot key utilized to access the reserved area and a password utilized so that only system BIOS access is allowed.

50. The method as described in claim 36, wherein a unique code is included in the reserve area so as to enable access to the reserve area.

51. The method as described in claim 50, wherein the unique code is matched with a signature included with the information so as to able the information to be stored in the reserve area.

52. The method as described in claim 36, wherein the information includes at least one of firmware update, feature, boot option, operating system image, multi-language drives, BIOS, assistive application software, system software, and diagnostic software.

53. A method for changing the size of a reserve area in a disk drive, said disk drive including a predetermined reserve storage area suitable for storing selected non-user accessible information, said reserve storage area having a predetermined storage capacity, said disk drive also including a user accessible area having a predetermined storage capacity, comprising:

receiving a command to change an amount of the reserve storage area on the disk drive;

converting the user accessible area on the disk drive to reserve area on the disk drive; and inputting information to the converted reserve storage area on the disk drive, wherein the reserve area includes a plurality of sub-areas.

54. The method as described in claim 53, wherein the inputted information includes at least one of data and program instructions.

55. The method as described in claim 53, wherein the inputted information is non user accessible information.

56. The method as described in claim 53, wherein the inputted information includes virus information.

57. The method as described in claim 53, wherein the inputted information includes predictive failure information.

58. The method as described in claim 57, wherein the predictive failure information includes information to predict disk drive failure.

59. The method as described in claim 53, wherein the inputted information includes a portion of the basic input/output system (BIOS).

60. The method as described in claim 53, wherein the inputted information includes emergency boot instructions.

61. The method as described in claim 53, wherein the inputted information includes information traditionally stored in ROM.

62. The method as described in claim 53, wherein the inputted information includes restoration information.

63. The method as described in claim 53, wherein the inputted information includes system level diagnostic information.

64. The method as described in claim 53, wherein the reserve area includes a first subarea suitable for access by a disk drive manufacturer, a second subarea suitable for access by a computer manufacturer, and a third subarea suitable for use as a generic area.

65. The method as described in claim 53, wherein the reserve area is suitable for being accessed by at least one of a hot key utilized to access the reserved area and a password utilized so that only system BIOS access is allowed.

66. The method as described in claim 53, wherein a unique code is included in the reserve area so as to enable access to the reserve area.

67. The method as described in claim 66, wherein the unique code is matched with a signature included with the information so as to able the information to be stored in the reserve area.

68. The method as described in claim 53, wherein the information includes at least one of firmware update, feature, boot option, operating system image, multi-language drives, BIOS, assistive application software, system software, and diagnostic software.

69. A method for accessing a reserve area in a disk drive, said disk drive including a reserve storage area suitable for storing selected non-user accessible information, said reserve storage area having a storage capacity, said disk drive also including a user accessible area having a storage capacity, comprising:

receiving a request to access the reserve area of the disk drive from a system BIOS, the request including a unique identifier;

identifying the unique identifier included in the request, wherein the unique identified received from the system BIOS is compared to a unique identifier included in the reserve area and wherein the unique identifier received from the system BIOS corresponds to the unique identifier included in the reserve area, access is permitted to the reserve area.

70. The method as described in claim 69, further comprising sending a request from the system BIOS in response to at least one of a keypress and failure of an information handling system to boot from at least one device listed in a setup boot menu.

71. The method as described in claim 69, wherein the reserve area includes bootable information.

72. A method for changing the size of a reserve area in a disk drive, said disk drive including a predetermined reserve storage area suitable for storing selected non-user accessible information, said reserve storage area having a predetermined storage capacity, said disk drive also including a user accessible area having a predetermined storage capacity, comprising:

receiving a command to change an amount of the reserve storage area on the disk drive;

converting the user accessible area on the disk drive to reserve area on the disk drive; and inputting information to the converted reserve storage area on the disk drive, wherein the reserve area is suitable for being accessed by at least one of a hot key utilized to access the reserved area and a password utilized so that only system BIOS access is allowed.

73. The method as described in claim 72, wherein the inputted information includes at least one of data and program instructions.

74. The method as described in claim 72, wherein the inputted information is non user accessible information.

75. The method as described in claim 72, wherein the inputted information includes virus information.

76. The method as described in claim 72, wherein the inputted information includes predictive failure information.

77. The method as described in claim 76, wherein the predictive failure information includes information to predict disk drive failure.

78. The method as described in claim 72, wherein the inputted information includes a portion of the basic input/output system (BIOS).

79. The method as described in claim 72, wherein the inputted information includes emergency boot instructions.

80. The method as described in claim 72, wherein the inputted information includes information traditionally stored in ROM.

81. The method as described in claim 72, wherein the inputted information includes restoration information.

82. The method as described in claim 72, wherein the inputted information includes system level diagnostic information.

83. The method as described in claim 72, wherein the reserve area includes a first subarea suitable for access by a disk drive manufacturer, a second subarea suitable for access by a computer manufacturer, and a third subarea suitable for use as a generic area.

84. The method as described in claim 72, wherein a unique code is included in the reserve area so as to enable access to the reserve area.

85. The method as described in claim 84, wherein the unique code is matched with a signature included with the information so as to able the information to be stored in the reserve area.

86. The method as described in claim 72, wherein the information includes at least one of firmware update, feature, boot option, operating system image, multi-language drives, BIOS, assistive application software, system software, and diagnostic software.

87. A method for changing the size of a reserve area in a disk drive, said disk drive including a predetermined reserve storage area suitable for storing selected non-user accessible information, said reserve storage area having a predetermined storage capacity, said disk drive also including a user accessible area having a predetermined storage capacity, comprising:

receiving a command to change an amount of the reserve storage area on the disk drive;

converting the user accessible area on the disk drive to reserve area on the disk drive; and inputting information to the converted reserve storage area on the disk drive, wherein a unique code is included in the reserve area so as to enable access to the reserve area.

88. The method as described in claim 87, wherein the inputted information includes at least one of data and program instructions.

89. The method as described in claim 87, wherein the inputted information is non user accessible information.

90. The method as described in claim 87, wherein the inputted information includes virus information.

91. The method as described in claim 87, wherein the inputted information includes predictive failure information.

92. The method as described in claim 91, wherein the predictive failure information includes information to predict disk drive failure.

93. The method as described in claim 87, wherein the inputted information includes a portion of the basic input/output system (BIOS).

94. The method as described in claim 87, wherein the inputted information includes emergency boot instructions.

95. The method as described in claim 87, wherein the inputted information includes information traditionally stored in ROM.

96. The method as described in claim 87, wherein the inputted information includes restoration information.

97. The method as described in claim 87, wherein the inputted information includes system level diagnostic information.

98. The method as described in claim 87, wherein the reserve area includes a first subarea suitable for access by a disk drive manufacturer, a second subarea suitable for access by a computer manufacturer, and a third subarea suitable for use as a generic area.

99. The method as described in claim 87, wherein the unique code is matched with a signature included with the information so as to able the information to be stored in the reserve area.

100. The method as described in claim 87, wherein the information includes at least one of firmware update, feature, boot option, operating system image, multi-language drives, BIOS, assistive application software, system software, and diagnostic software.

* * * * *